Feb. 26, 1963  C. W. HEDSTROM  3,079,173
VELOCIPEDE HEAD FRAME STRUCTURE
Filed Oct. 24, 1961  2 Sheets-Sheet 2
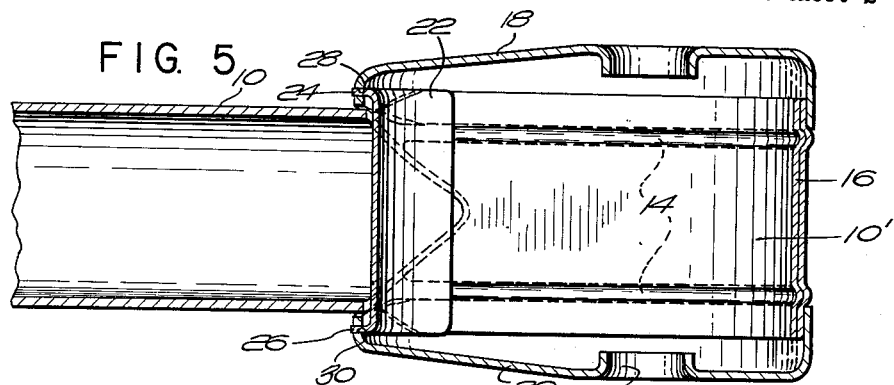
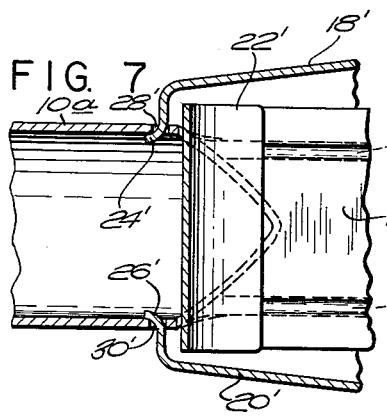
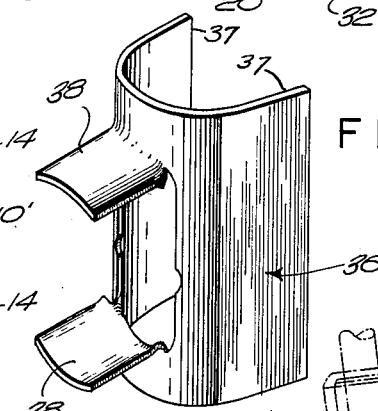
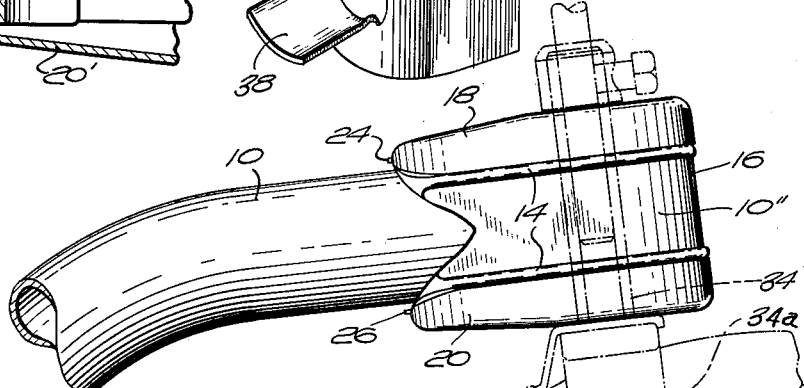
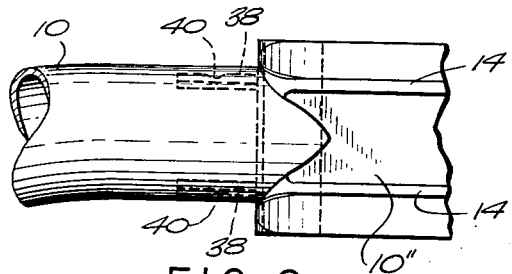
INVENTOR.
CARL W. HEDSTROM
BY Emery, Booth, Miller, + Townsend
ATTORNEYS

United States Patent Office 3,079,173
Patented Feb. 26, 1963

3,079,173
VELOCIPEDE HEAD FRAME STRUCTURE
Carl W. Hedstrom, Gardner, Mass., assignor to Hedstrom Union Company, Fitchburg, Mass., a corporation of Massachusetts
Filed Oct. 24, 1961, Ser. No. 147,242
8 Claims. (Cl. 280—279)

This invention relates to improvements in velocipedes and methods of producing them and provides, more particularly, an improved head structure for the frames of velocipedes, and improvements in the method of producing such head structures.

This is a continuation-in-part of my application Serial No. 733,123, filed May 5, 1958, now abandoned.

It is among the objects of the invention to provide a velocipede head frame structure wherein a tubular part of the frame has an end portion thereof formed, under pressure, into a generally ovate housing integral on said tubular element and providing upper and lower seats for reception of upper and lower bearing caps wherein the spindle of the front fork of a velocipede may be effectively journaled.

Another object of the invention is to provide a tubular velocipede frame element having integrally formed thereon at one end a housing providing upper and lower seats for bearing caps which may be spot welded to the said housing for effectively journaling the spindle of the front fork of a velocipede.

Yet another object of the invention is to provide a tubular velocipede frame element having an end portion deeply grooved to provide two opposite arcuate sections, each of which is pressed to general flatness and formed to provide a generally ovate housing providing upper and lower edge-seats for a pair of bearing caps which are adapted to be welded to the said housing for journaling the spindle of the front fork of a velocipede.

Still another object of the invention is to provide a unitary velocipede head frame structure which is stronger and more durable than prior comparable head structures in being reinforced at those points most susceptible to fatigue distress caused by road induced strains and stresses.

It is moreover my purpose and object generally to improvide velocipede frame structures, and methods of producing them, and more especially the bearing head of such frames wherein the spindle of the front fork of the velocipede is journaled.

In the accompanying drawing:

FIG. 5 is a medial cross-sectional view of the structure as represented in FIGS. 3 and 4, but showing upper and lower bearing caps secured in place on the housing member, the scale being substantially larger than that of FIGS. 3 and 4;

FIG. 6 is a side elevational view of the structure of FIG. 5, on the scale of FIGS. 3 and 4, and showing, by dotted lines, a front fork of a velocipede journaled within the bearing caps of the housing;

FIG. 7 is a fragmentary cross-sectional view, on the scale of FIG. 5, showing a modified form of tongue-in-slot retaining means for the bearing caps on the housing;

FIG. 8 is a perspective view of a modified form of reinforcing member; and

FIG. 9 is a side elevation of a portion of the structure as seen in FIG. 4, but showing the modified FIG. 8 form of reinforcing member secured within the housing.

Figure 1:
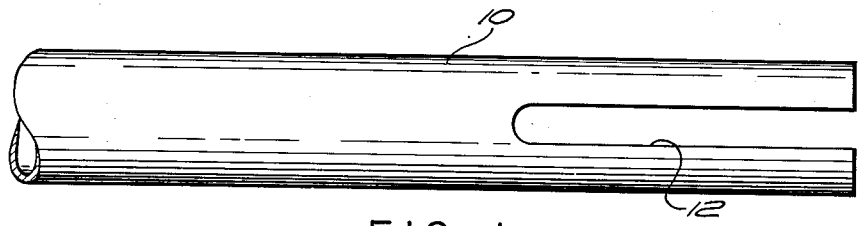
FIG. 1 is an elevational view of a section of tubing having a relatively deep groove cut inward from one end of the element.

Referring to the drawing, the tubular element 10 may be the velocipede frame element which customarily extends upwardly and forwardly from any suitable rear axle structure to the frame head within which the spindle of the front fork of the velocipede is journaled.

Figure 2:
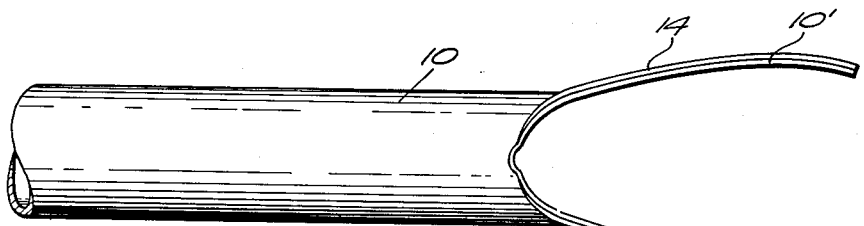
FIG. 2 is a view generally similar to FIG. 1 but showing the wall portions at opposite sides of the groove pressed to general flatness.

According to the invention, the tubular element 10 preferably will have substantial diameter, such as of the order of 2 inch outside diameter, for example, so that the forward end portion of the element may be relatively deeply grooved as at 12 in FIG. 1. The resulting oppositely disposed cross-sectionally arcuate wall portions of element 10 are pressed to general flatness at 10', 10" in FIG. 2. Preferably, each generally flat portion 10', 10" has spaced stiffening ribs 14 formed therein, and these portions 10', 10" are shaped, under pressure, to provide the generally ovate housing as seen in FIG. 3 which is open at its top and bottom portions, and in which the generally similar ends of the portions 10', 10" are brought into overlapping relation at 16 and secured together by any suitable means, such as by spot-welding, for example.

The ovate housing provides upper and lower edge margins of the portions 10', 10" upon which bearing caps 18, 20 are adapted to seat, as represented in FIGS. 5 and 6.

Figure 3:
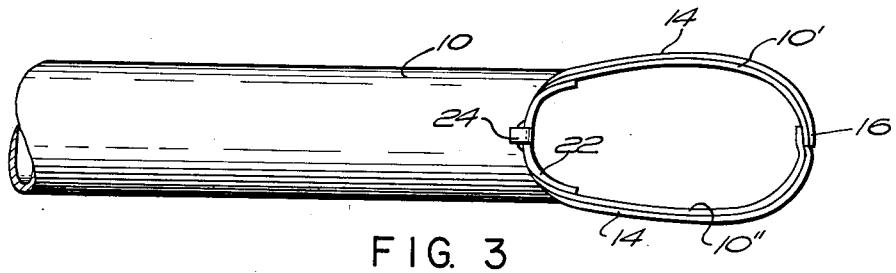
FIG. 3 is a view generally similar to FIGS. 1 and 2 but showing the ends of the flattened wall portions of FIG. 2 bent toward each other and overlapped to provide a generally ovate housing, and showing a reinforcing and cap-locking member mounted within the smaller end of the housing.
Figure 4:
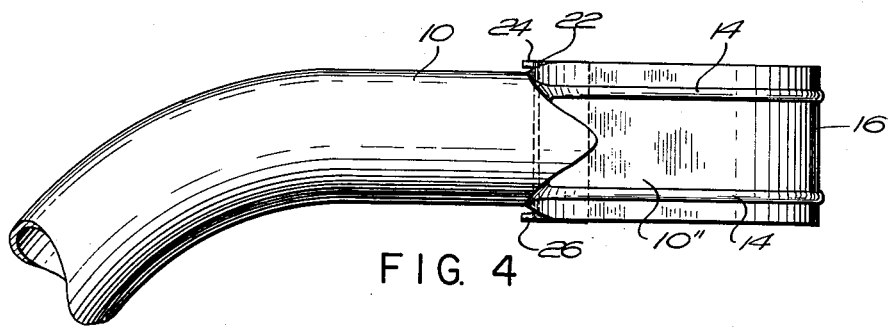
FIG. 4 is a side elevation of the structure as seen in FIG. 3.

Prior to seating of the caps 18, 20, a generally channel-shaped reinforcing member 22 preferably is arranged and secured, as by spot-welding, in the smaller end of the ovate housing, as best seen in FIGS. 3, 4 and 5. In the preferred embodiment, the member 22 is formed with a locking tongue 24 and a locking tongue 26 at its upper and lower edges, respectively, for engaging, respectively, in slots 28, 30 in the bearing caps 18, 20 respectively, as shown in FIG. 5. This tongue-in-slot locking of the caps 18, 20, at the smaller end of the ovate housing, facilitates seating of the caps and the ultimate securing of them on their seats, as by spot-welding, for example.

Each of the bearing caps 18, 20 has a flanged opening 32 therein for journaling the spindle 34 of the front fork 34a of a velocipede, as illustrated in FIG. 6. Preferably, the cap openings 32 will be of size to accommodate ball-bearing units (not shown) between the flanges of the openings and the fork spindle 34.

FIG. 7 illustrates a modification in which locking tongues 24', 26' are formed on the bearing caps 18', 20', respectively, for being engaged in slots 28', 30' in the tubular frame element 10a and in which a modified reinforcing member 22' without locking tongues is secured within the housing.

FIGS. 8 and 9 illustrate a modified form of reinforcing member indicated generally at 36. Member 36 has similar side extending wing portions 37 extending substantially outward along and which are secured to projections 10', 10" when member 36 is seated within the housing. Member 36 has also protruding tongues or tabs 38 formed, for example, by punching and bending outward rear portions of the member and which are adapted to extend a considerable distance into the end of and to be secured to tubular element 10 when the member 36 is properly seated within the housing.

As best seen in FIG. 9, the tabs 38 extend into the tubular element 10 and are attached or secured to the inside wall of the tube at points spaced considerably away from the base of projections 10', 10" as by welds 40 thereby rigidly connecting the member 36 to an unstrained portion of the frame element 10, and acting as a bridge across those tube portions subjected to stresses caused by the flattening out of the projections 10', 10" during the forming of the housing.

The herein disclosed method of forming a velocipede bearing head simplifies manufacturing procedures, as compared with prior practices, and provides a stronger and more effective bearing unit for journaling the front fork spindle, either with or without roller-bearing units in the bearing caps of the unit.

It will be obvious that various changes in the described procedure and structure may be made without departing from the essential features of the invention as defined in the appended claims, and it is intended that the patent shall cover, by suitable expression in the appended claims, whatever features of patentable novelty exist in the invention disclosed.

I claim as my invention:

1. A bearing head structure for velocipede frames, and the like, comprising a tubular frame element having opposite wall portions at one end of the element spread apart and flattened to provide a pair of generally flat and spaced projections integral on said tubular element, said projections being bowed and having their ends brought together and secured to provide an open-ended generally ovate housing, a reinforcing channel member secured within said housing at the juncture region of said projections, a pair of bearing caps, each mounted on said housing for closing different open ends thereof, and coacting means on said reinforcing member and said caps for inter-locking retention of adjacent portions of said caps while more remote portions of the caps are being pressed into place on said housing and permanently secured thereon, each said cap having an opening therethrough axially aligned with the similar opening in the other cap for reception of the spindle of the front fork of a velocipede inserted through said caps and housing.

2. In a bearing head structure for velocipede frames and the like comprising a tubular frame element having oppositely disposed and spaced generally flat integral projections thereon, said projections being bowed and secured at their ends to provide an open ended generally ovate housing, a reinforcing member secured in said housing at the base of said projections, bearing caps seated at the ends of said housing and having axially aligned openings therethrough for receiving a front fork spindle, and means on said member interlocking with and positioning said caps.

3. A bearing head structure for velocipede frames and the like comprising a tubular frame element having oppositely disposed and spaced generally flat integral projections thereon, said projections being bowed and secured at their ends to provide an open ended generally ovate housing, bearing caps seated at the ends of said housing and having axially aligned openings therethrough for receiving a front fork spindle, and means on said frame element for inter-locking with and thereby permanently securing each said cap to said housing.

4. A bearing head structure for velocipede frames as defined in claim 3 wherein each of said projections has a stiffening rib abutting the edges of the bearing caps thereon.

5. A bearing head structure for velocipede frames and the like comprising a tubular frame element having oppositely disposed and spaced generally flat integral projections thereon, said projections being bowed and secured at their ends to provide an open ended generally ovate housing, bearing caps seated and secured at the ends of said housing and having axially aligned openings therethrough whereby the spindle of the front fork of a velocipede may be inserted through said housing and be journaled in said caps, and a generally channel-shaped reinforcing member arranged and secured in the smaller end of said housing at the base of said projections and extending intermediate said bearing caps.

6. A velocipede head frame structure comprising a tubular frame element having oppositely disposed and spaced generally flat integral projections at an end thereof, said projections being bowed and secured at their ends to provide an open ended housing, bearing caps seated and secured at the ends of said housing and having axially aligned openings therethrough, whereby the spindle of the front fork of a velocipede may be inserted into said housing and be journaled in said caps, and a reinforcing member arranged and secured in said housing at the base of said projections and extending intermediate said bearing caps, said member abutting said end of said tubular frame element and having wing portions extending substantially outward from the base of and along said projections, said member having also a portion thereof extending substantially into said end of and secured to the wall of said tubular frame element at a point removed from said base of said projections, said reinforcing member contributing a substantial amount of reinforcing strength to said head frame structure at said base of said projections.

7. A velocipede head frame structure comprising a tubular frame element having oppositely disposed and spaced generally flat integral projections at an end thereof, said projections being bowed and secured at their ends to provide an open ended housing, bearing caps seated and secured at the ends of said housing and having axially aligned openings therethrough whereby the spindle of the front fork of a velocipede may be inserted into said housing and be journaled in said caps, and reinforcing means arranged within said housing, said reinforcing means having wing portions extending substantially outward from the base of and along said projections, said reinforcing means also being secured to said projections and to the wall of said frame element, within said end, whereby to contribute a substantial amount of reinforcing strength to said frame structure at said base of said projections and bridging those frame portions most subject to fatigue distress.

8. A velocipede head frame structure comprising a tubular frame element having oppositely disposed and spaced generally flat integral projections at an end thereof, said projections being bowed and secured at their ends to provide a housing, bearing caps seated and secured at the ends of said housing and having axially aligned openings therethrough whereby the spindle of the front fork of a velocipede may be inserted into said housing and be journaled in said caps, and a generally channel-shaped reinforcing member arranged and secured in said housing at the base of said projections and extending intermediate said bearing caps, said reinforcing member abutting said end of said tubular frame element and having a plurality of integral tongue extensions extending into and secured to said frame element at wall portions remote from said base of said projections, said reinforcing member thereby contributing a substantial amount of reinforcing strength to said frame structure at said base of said projections and bridging those frame portions most subject to fatigue distress.

References Cited in the file of this patent

UNITED STATES PATENTS

| 2,144,332 | Glaser | Jan. 17, 1939 |
| 2,335,583 | Conti | Nov. 30, 1943 |

FOREIGN PATENTS

| 19,303 | Great Britain | of 1903 |